(12) United States Patent
Hsu et al.

(10) Patent No.: US 8,234,426 B2
(45) Date of Patent: Jul. 31, 2012

(54) SWITCHING INTERFACE METHOD FOR A MULTI-INTERFACE STORAGE DEVICE

(75) Inventors: Chin-Tung Hsu, Longtan Shiang (TW); Tsung-Ming Chang, Taichung (TW); Tsung-Hang Wu, Taipei (TW)

(73) Assignee: Innostor Technology Corporation, Hsinchu County (TW)

( * ) Notice: Subject to any disclaimer, the term of this patent is extended or adjusted under 35 U.S.C. 154(b) by 259 days.

(21) Appl. No.: 12/802,494

(22) Filed: Jun. 8, 2010

(65) Prior Publication Data

US 2011/0302350 A1  Dec. 8, 2011

(51) Int. Cl.
*G06F 13/00* (2006.01)
*G06F 13/40* (2006.01)
*G06F 13/42* (2006.01)

(52) U.S. Cl. ......... 710/104; 710/105; 710/305; 710/313

(58) Field of Classification Search ................... 710/315
See application file for complete search history.

(56) References Cited

U.S. PATENT DOCUMENTS

| | | | | |
|---|---|---|---|---|
| 6,385,677 B1* | 5/2002 | Yao | .............................. | 711/115 |
| 6,567,273 B1* | 5/2003 | Liu et al. | ...................... | 361/737 |
| 6,658,516 B2* | 12/2003 | Yao | .............................. | 710/301 |
| 6,676,420 B1* | 1/2004 | Liu et al. | ...................... | 439/131 |
| 6,712,277 B2* | 3/2004 | Spencer | ........................ | 235/492 |
| 6,795,327 B2* | 9/2004 | Deng et al. | ....................... | 365/63 |
| 6,895,447 B2* | 5/2005 | Brewer et al. | .................... | 710/11 |
| 7,535,718 B2* | 5/2009 | Le | .................................. | 361/737 |
| 7,836,236 B2* | 11/2010 | Chou et al. | ..................... | 710/301 |
| 7,987,308 B2* | 7/2011 | Jo et al. | ......................... | 710/301 |
| 8,001,304 B2* | 8/2011 | Yung et al. | ...................... | 710/74 |
| 2003/0099147 A1* | 5/2003 | Deng et al. | ................. | 365/230.05 |
| 2003/0212848 A1* | 11/2003 | Liu et al. | ....................... | 710/305 |
| 2004/0059846 A1* | 3/2004 | Liu et al. | .......................... | 710/62 |
| 2005/0216624 A1* | 9/2005 | Deng et al. | ...................... | 710/74 |
| 2008/0162755 A1* | 7/2008 | Minami | ........................... | 710/74 |
| 2008/0288703 A1* | 11/2008 | Iyer | ............................... | 710/305 |

\* cited by examiner

*Primary Examiner* — Ryan Stiglic

(74) *Attorney, Agent, or Firm* — William E. Pelton, Esq.; Cooper & Dunham LLP

(57) ABSTRACT

The present invention discloses a switching interface method for multi-interface storage device having a transmission interfaces and a predetermining list that stores different priority weights for the transmission interfaces. When the storage device connects to a computer, the switching interface method is executed and one of the transmission interfaces is selected to communicate with the computer according to the priority weight in sequence. In addition, a user's interface is also provided for the user, and the user can switch other transmission interface of the multi-interface storage device to link to the computer. Therefore, the multi-interface storage device may link to most of the computers and successfully communicate with the computer.

7 Claims, 6 Drawing Sheets

| TRANSMISSION INTERFACE (I) | PRIORITY WEIGHT (P) | STANDARD PROTOCOL (S) | LINKING PROCEDURE (FW) |
|---|---|---|---|
| I1 | P1 | S1 | FW1 |
| I2 | P2 | S2 | FW2 |
| I3 | P3 | S3 | FW3 |

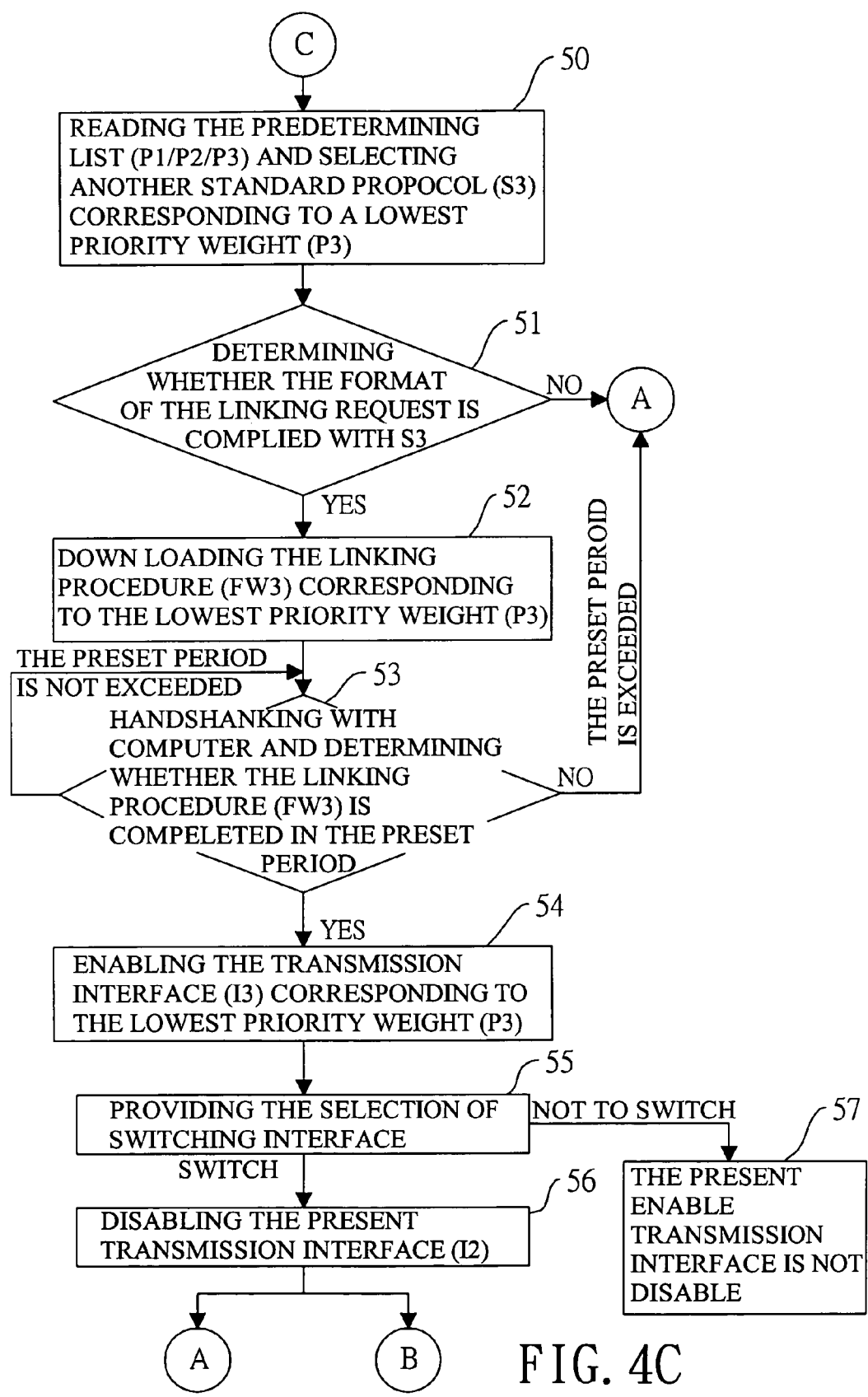

SWITCHING INTERFACE METHOD FOR A MULTI-INTERFACE STORAGE DEVICE

BACKGROUND OF THE INVENTION

1. Field of the Invention

The present invention relates to the field of a communication technique between computer and storage device, and more particularly to a switching interface method for a multi-interface storage device.

2. Description of Related Art

Since different communication interfaces are proposed for high-speed transmission and the small individual storage device is common, the types of storage devices are various, such as USB flash memory device, eSATA flash memory device, SATA portable hard disk etc. However, the eSATA flash memory device or SATA portable hard disk requires an external power connector to obtain working power source, so the cost of the eSATA flash memory device or the SATA portable hard disk is high. Therefore, the improved current SATA or eSATA flash memory device further has a USB connector and the current flash memory have multi-interfaces.

In general, a user uses the SATA plug of the SATA portable hard disk plugs in a corresponding SATA socket of a computer. If the computer has an Advanced Host Controller Interface (hereinafter AHCI), the SATA portable hard disk support the hot-swap function. On the contrary, the computer without the AHCI does not enable and read the SATA portable hard disk after the computer powers on.

Furthermore, the multi-interface storage device does not have a capability of auto-switching interface after the computer powers on. Therefore, the multi-interface storage device is useless when the computer does not drive and read it.

To overcome the shortcomings, the present invention provides a switching interface method for a multi-interface storage device to mitigate or obviate the aforementioned problems.

SUMMARY OF THE INVENTION

The main objective of the present invention is to provide a switching interface method for a multi-interface storage device that allows a user to select a proper interface of the multi-interface storage device to communicate with the computer.

The switching interface method for multi-interface storage device having a transmission interfaces and a predetermining list that stores different priority weights for the transmission interfaces. When the storage device connects to a computer, the switching interface method is executed and one of the transmission interfaces is selected to communicate with the computer according to the priority weight in sequence. In addition, a user's interface is also provided for the user, and the user can switch other transmission interface of the multi-interface storage device to link to the computer. Therefore, the multi-interface storage device may link to most of the computers and successfully communicate with the computer.

Other objectives, advantages and novel features of the invention will become more apparent from the following detailed description when taken in conjunction with the accompanying drawings.

BRIEF DESCRIPTION OF THE DRAWINGS

FIGS. 4A to 4C are flow charts of a second embodiment of a switching interface method in accordance with the present invention.

DETAILED DESCRIPTION OF THE PREFERRED EMBODIMENT

Figures 1, 2:
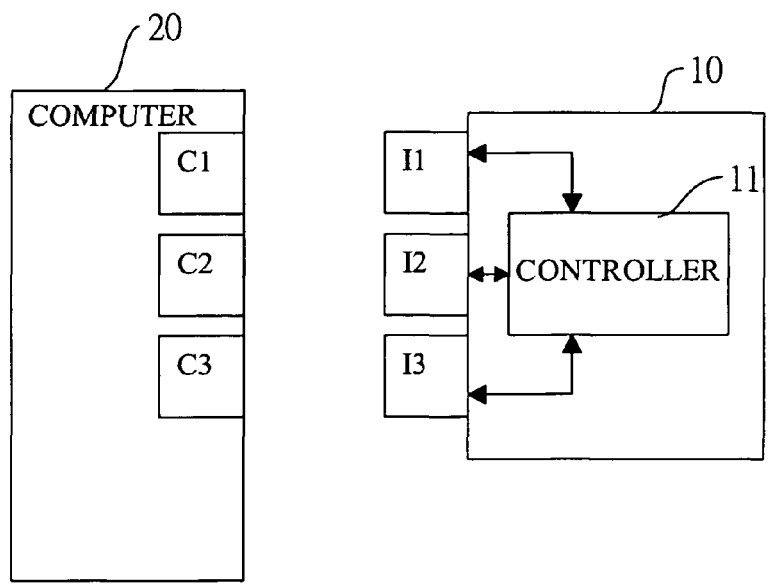
FIG. 1 is a schematic diagram of a multi-interface storage device and a computer in accordance with the present invention.
FIG. 2 is a predetermining list built inside the multi-interface storage device in accordance with the present invention.

With reference to FIG. 1, a multi-interface storage device (10) has multiple transmission interfaces (I1 to I3) and a controller (11) electronically connected to each of the transmission interfaces (I1 to I3).

The controller (11) stores a predetermining list (111). The predetermining list (111) is used to determine priority of each of the transmission interfaces (I1 to I3). The transmission interfaces (I1 to I3) may be respectively formed independent physical connecting plugs or formed a physical connecting plug.

The computer (20) has multiple sockets (C1 to C3) corresponding to the transmission interfaces (I1 to I3) of the storage device (10). The sockets (C1 to C3) may be respectively formed independent physical connecting sockets or formed a physical connecting socket.

Figure 3:
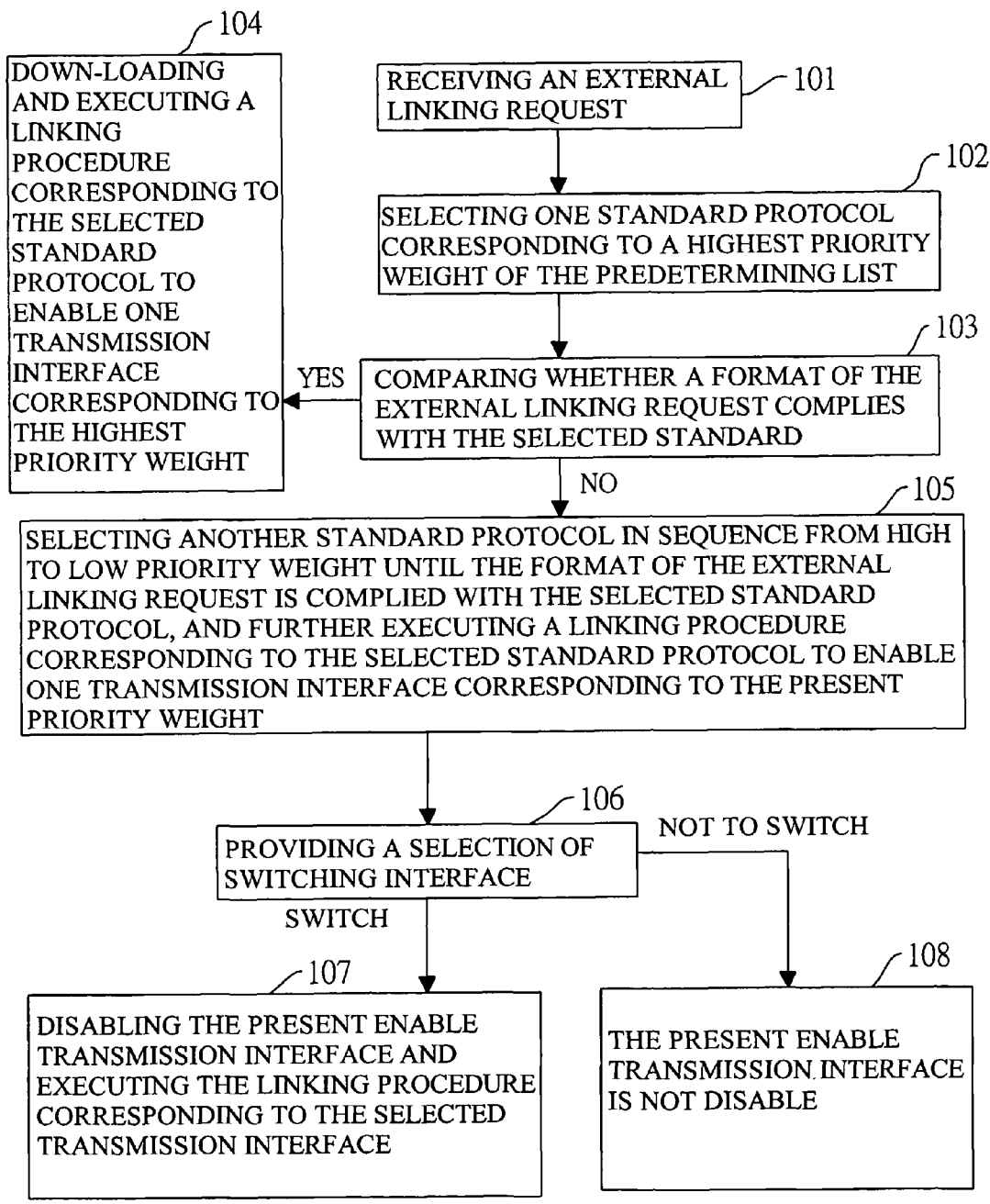
FIG. 3 is a flow chart of a first embodiment of a switching interface method in accordance with the present invention.

With reference to FIGS. 2 and 3, the predetermining list (111) has priority weights (P), standard protocols (S) and linking procedures (FW) of the transmission interfaces I1 to I3). The switching interface method for the multi-interface storage device in accordance with the present invention has steps of:

(a) receiving an external linking request (101);

(b) selecting one standard protocol (S1) corresponding to a highest priority weight (P1) of the predetermining list (111) (102);

(c) comparing whether a format of the external linking request complies with the selected standard protocol (S1) (103); wherein if the format of the external linking request is complied with the selected standard protocol (S1), down-loading and executing a linking procedure (FW1) corresponding to the selected standard protocol (S1) to enable one transmission interface (I1) corresponding to the highest priority weight (P1); and if the format of the external linking request is not complied with the selected standard protocol (S1), selecting another standard protocol (S2) in sequence from high to low priority weight (P1 to P3) until the format of the external linking request complies with the selected standard protocol (S2 or S3), and further executing a linking procedure (FW2 or FW3) corresponding to the selected standard protocol (S2 or S3) to enable one transmission interface (I2 or I3) corresponding to the present priority weight (P2 or P3)(105);

(d) providing a selection of switching interface (106); and (e) determining whether another transmission interface is selected by the selection of switching interface; if so, disabling the present enable transmission interface and executing the linking procedure corresponding to the selected transmission interface (107); and if not, the present enable transmission interface is not disable (108).

With reference to FIGS. 1, 2 and 4A to 4C, the switching interface method is used for the multi-interface storage device

(10) having three different transmission interfaces (I1 to I3) corresponding to three different sockets (C1 to C3) of the computer (20).

Figure 4A:
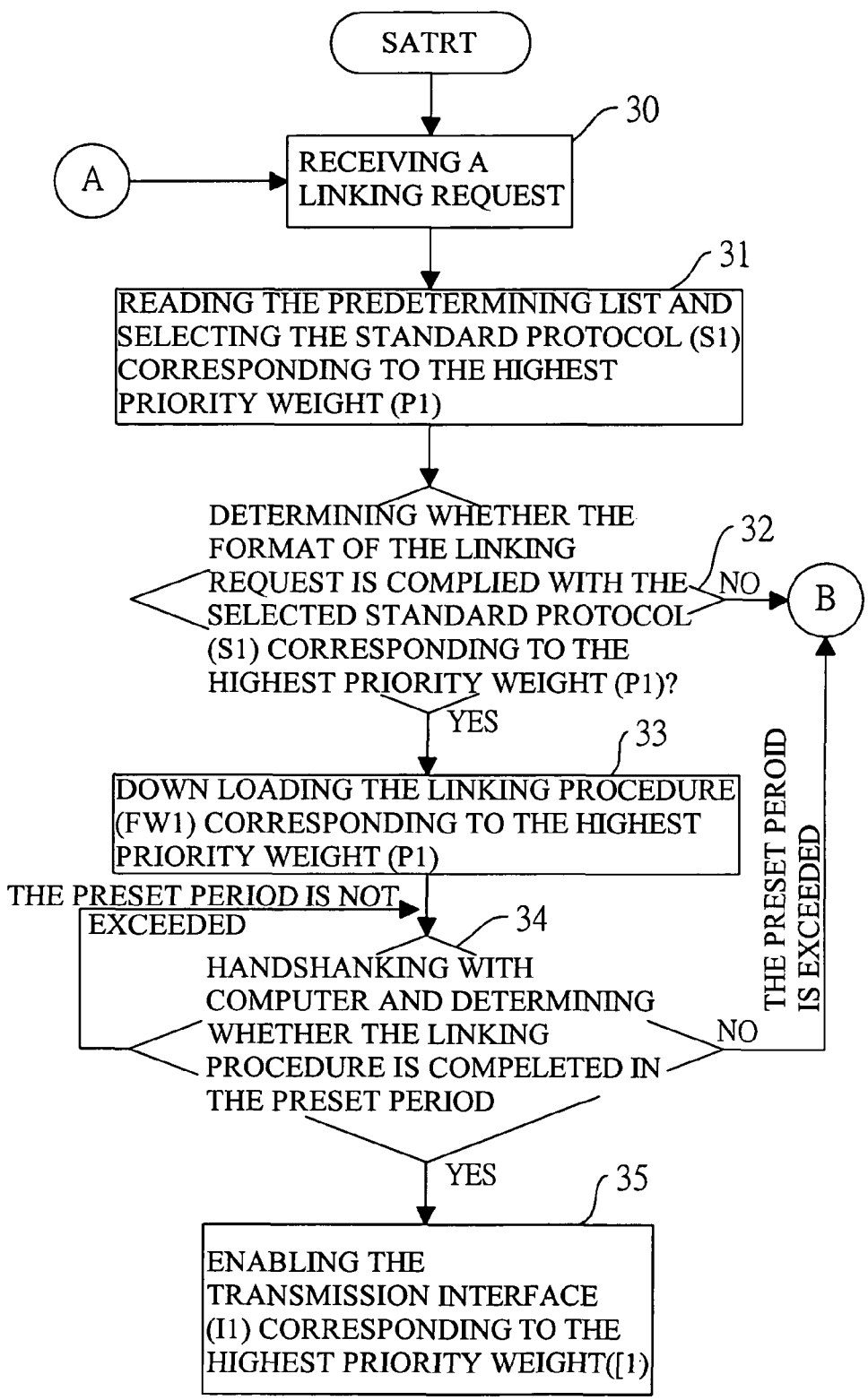

Firstly referring to FIG. 4A, the computer (20) sends a linking request to each transmission interface I1 to I3 of the storage device (10) after the storage device (10) is connected to the corresponding socket (C1 to C3) of the computer (20). The controller (11) of the storage device (10) reads the predetermining list (111) to execute the switching interface method (31) after the linking request from the computer (10) is received (30). The controller (11) selects and enables one of the transmission interfaces (I1, I2 or I3). That is, the controller (11) firstly reads the standard protocol (S1) corresponding the highest priority weight (P1) of the predetermining list (111) and determines whether the format of the linking request from the computer (20) complies with the present standard protocol (S1) (32). If the format of the linking request complies with the present standard protocol (S1), the controller (11) down loads and executes the linking procedure (FW1) (ex. handshake procedure) corresponding to the highest priority weight (P1) (33). If the linking procedure (FW1) is not completed in a preset period (34), the present transmission interface (I1) is not enabled. Therefore, the preset period is a factor to determine whether the linking procedure (FW1) is completed. When the linking procedure (FW1) is completed during the preset period, the storage device (10) may communicate with the computer (20) through the present transmission interface (I1) (35). On the contrary, the controller (11) goes to FIG. 4B.

Figure 4B:
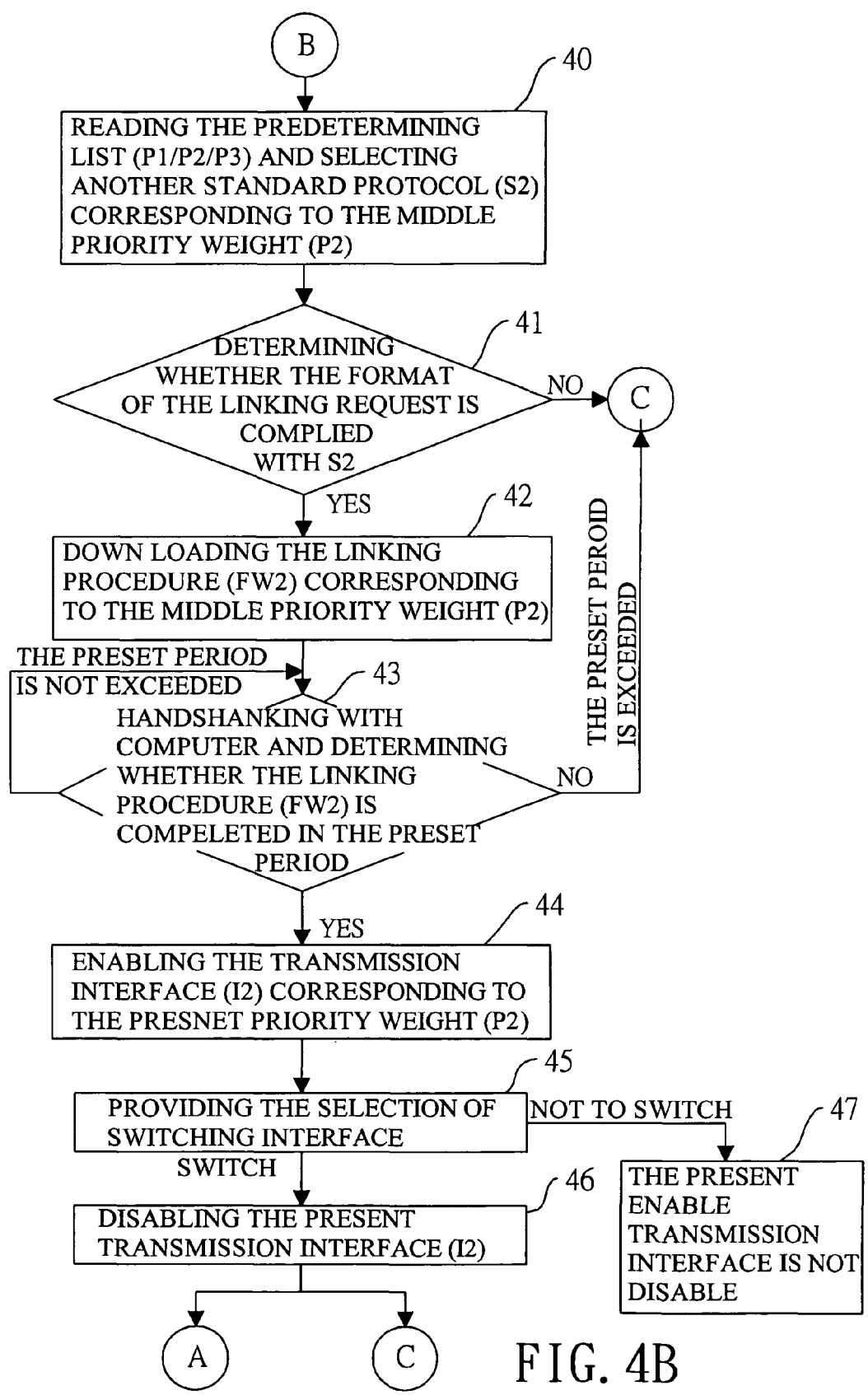

If the format of the linking request form the computer (20) does not comply with the standard protocol (S1) corresponding to the highest priority weight (P1) or the linking procedure of the highest priority weight (P1) is not completed, the controller (11) also executes following steps as shown in FIG. 4B. The controller (11) reads the predetermining list (111) to select a standard protocol (S2) corresponding to the middle priority weight (P2) (40) and then compares whether the format of the linking request from the computer (20) complies with the present standard protocol (S2) (41). If a comparing result is positive, the controller (11) further down loads and executes another linking procedure (FW2) corresponding to the middle priority weight (P2) (42). On the contrary, go to FIG. 4C. In addition, the controller (11) further determines whether the present linking procedure (FW2) is completed in the present period (43). If the linking procedure (FW2) does not complete the linking procedure (FW2) in the preset period, the transmission interface (I2) corresponding to the middle priority weight (P2) is not enabled to communicate with the computer (20). If the controller (11) completes the linking procedure in the preset period, the controller (11) enables the transmission interface (I2) corresponding to the middle priority weight (P2) (44). Therefore, the storage device (10) communicates with the computer (20) through the second transmission interface (I2). At the same time, the computer (20) provides a user's interface for switching interface and the user may select another transmission interface (I1 or I3) to communicate with the computer (20). That is, the user's interface shows other two transmission interfaces (I1 or I3) for the user (45). If the user selects the first transmission interface (I1), the controller (11) disable the present transmission interface (I2) and goes to FIG. 4A. If the user selects the third transmission interface (I3) the controller disable the present transmission interface (I2) and goes to FIG. 4C. If the user does not select another transmission interface (IL, I3), the present transmission interface (I2) is still enabled (47).

If the format of the linking request form the computer (20) does not comply with the standard protocol (S2) corresponding to the middle priority weight (P2) or the linking procedure (FW2) corresponding to the middle priority weight (P2) is not completed, the controller (11) also executes following steps as shown in FIG. 4C. The controller (11) reads the predetermining list (111) to select a standard protocol (S3) corresponding to the lowest priority weight (P3) (50) and then compares whether the format of the linking request from the computer (20) complies with the standard protocol (S3) (51). If a comparing result is positive, the controller (11) further down loads and executes another linking procedure (FW3) corresponding to the lowest priority weight (P3) (52). If not, the controller (11) goes to FIG. 4A. In addition, the controller (11) further determines whether the present linking procedure is completed in the preset period (53). If the present linking procedure (FW3) does not complete in the preset period, the transmission interface (I3) corresponding to the lowest priority weight (P3) is not enabled to communicate with the computer (20). If the controller (11) completes the linking procedure (FW3) in the preset period, the controller (11) enables the third transmission interface (I3) corresponding to the lowest priority weight (P3) (54). Therefore, the storage device (10) communicates with the computer (20) through the third transmission interface (I3). At the same time, the computer (20) provides the user's interface to show the first and second transmission interfaces (I1, I2) (55). If the user selects the first transmission interface (I1), the controller (11) disables the present transmission interface (I3) and goes to FIG. 4A. If the user selects the second transmission interface (I2), the controller disables the present transmission interface (I3) and goes to FIG. 4B. If the user does not select another transmission interface (I1, I2), the present transmission interface (I3) is still enabled (57).

However, if the linking procedure (FW3) corresponding to the third transmission interface (I3) is not completed in the preset period or the format of the linking request is not complied with the standard protocol (S3) corresponding to the lowest priority weight (P3), the controller (11) goes to FIG. 4A to re-execute the linking procedure (FW1) of the first transmission interface (I1) until one of the linking procedure is completed.

Figure 5:
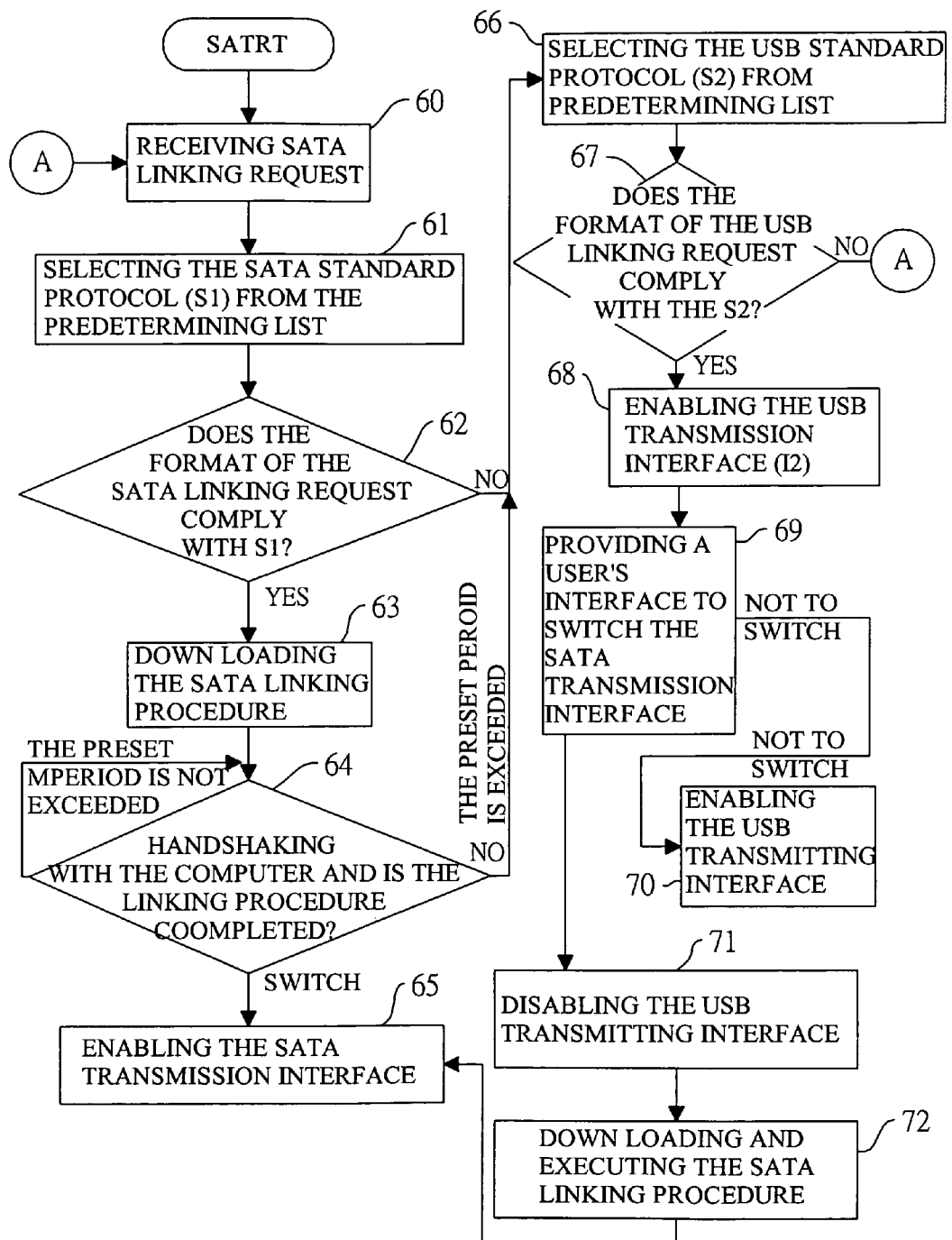
FIG. 5 is a flow char of a third embodiment of a switching interface method in accordance with the present invention.

With reference to FIG. 5, the switching interface method is used for the multi-interface storage device has a SATA and USB transmission interfaces corresponding to three different sockets of the computer. The transmission speed of the SATA transmission interface is higher than that of the USB transmission interface. The storage device connected to the computer through the SATA and USB transmission interface at the same time. Since the SATA transmission interface does not have power pins, the power source of the storage device is obtained from the computer through the USB transmission interface.

The computer sends the linking request to the SATA and USB transmission interfaces of the storage to ask link. When the storage device turns on, the linking request from the computer is received (60). The controller of the storage device reads the predetermining list to select the standard protocol according the highest priority weight (61). The controller further compares whether the format of the linking request is complied with the selected format protocol (62). In this embodiment, the first transmission interface corresponding to the highest priority weight is SATA transmission interface. Therefore, the controller determines whether the format of the linking request is complied with the SATA standard protocol. If the computer supports AHCI, the format of the linking request complies with the SATA standard protocol and the controller down loads the linking procedure of the SATA linking procedure (63) to handshake with the computer. If the SATA linking procedure is completed in the preset period (64), the controller enables the SATA transmission interface (65). On the contrary, if the linking procedure is not completed, the computer may not support AHCI, so the controller automatically switches to enable the USB transmission interface and communicates with the computer through the USB transmission interface. That is, the controller further reads the predetermining list to select the next standard protocol corresponding to the next priority weight (66) and compares whether the format of the linking request is complied with the selected standard protocol (67). The controller reads the USB standard protocol and determines whether the format of the linking request is complied with the USB standard protocol. If the determining result is positive, the controller down loads the USB linking procedure to handshake with the computer. If the present linking procedure is completed in the preset period, the controller enables the USB transmission interface (68). Since the present computer has USB socket, most of the USB transmission interfaces successfully links to the computer. Since the computer provides the user the user's interface to switch the transmission interface (69), the user may switch to re-enable the SATA transmission interface. Before switch to the SATA transmission interface, the controller has to disable the USB transmission interface (71) and down loads and executes the SATA linking procedure (72). When the SATA linking procedure is completed, the controller enables the SATA transmission interface (65). If the user does not select to switch SATA transmission interface, the USB transmission interface is still enabled (70). The user's interface is implemented by the application program (AP), BIOS, firmware or GPIO. Using the AP as an example, the computer generates a window to show the user's interface and the window having button thereon. Therefore, the user may easily click the button to select another transmission interface.

In other embodiments, the storage device may have SATA, USB and IEEE1394 transmission interfaces, or SATA, USB and PCI-e transmission interfaces, or SATA, PCI-e and IEEE1394 transmission interfaces.

Based on foregoing description, when the multi-interface storage device having the switching interface method connects to the computer, the multi-interface storage device automatically selects one of the transmission interfaces to link to the computer corresponding to the priority weight in sequence. In addition, the user's interface is also provided for the user, and the user can switch other transmission interface of the multi-interface storage device to link to the computer. Therefore, the multi-interface storage device may link to most of the computers and successfully communicate with the computer. Besides, the multi-interface storage device maker may set different priority weights of the transmission interfaces in the predetermining list for different purposes.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A switching interface method for a multi-interface storage device, wherein the multi-interface storage device having different transmission interfaces, and a controller electronically connected to the transmission interfaces and having a predetermining list storing different priority weights for the transmission interfaces, standard protocols for the transmission interfaces, linking procedures for the transmission interfaces; and the switching interface method comprises steps of:
    (a) receiving an external linking request;
    (b) selecting one standard protocol corresponding to a highest priority weight of the predetermining list;
    (c) comparing whether a format of the external linking request complies with the selected standard protocol; wherein
        if the format of the external linking request is complied with the selected standard protocol, down-loading and executing a linking procedure corresponding to the selected standard protocol to enable one transmission interface corresponding to the highest priority weight; and
        if the format of the external linking request is not complied with the selected standard protocol, selecting another standard protocol in sequence from high to low priority weight until the format of the external linking request is complied with the selected standard protocol, and further executing a linking procedure corresponding to the selected standard protocol to enable one transmission interface corresponding to the present priority weight;
    (d) providing a selection of switching interface; and
    (e) determining whether another transmission interface is selected by the selection of switching interface; if so, disabling the present enable transmission interface and executing the linking procedure corresponding to the selected transmission interface; and if not, the present enable transmission interface is not disable.

2. The switching interface method as claimed in claim 1, wherein the predetermining list stores two different priority weights for two transmission interfaces and two standard protocols and two linking procedures corresponding to the priority weights.

3. The switching interface method as claimed in claim 2, wherein the transmission interface corresponding to the highest priority weight is SATA transmission interface and the other transmission interface is USB transmission interface.

4. The switching interface method as claimed in claim 2, wherein the predetermining list stores three different priority weights for three transmission interfaces and three standard protocols and three linking procedures corresponding to the priority weights.

5. The switching interface method as claimed in claim 4, wherein the transmission interfaces corresponding to the priority weights are SATA, USB and IEEE1394 transmission interfaces.

6. The switching interface method as claimed in claim 4, wherein the transmission interfaces corresponding to the priority weights are SATA, USB and PCI-e transmission interfaces.

7. The switching interface method as claimed in claim 4, wherein the transmission interfaces corresponding to the priority weights are SATA, PCI-e and IEEE1394 transmission interfaces.

* * * * *